UNITED STATES PATENT OFFICE.

ALCIDE FRANÇOIS POIRRIER AND DANIEL AUGUSTE ROSENSTIEHL, OF PARIS, FRANCE, ASSIGNORS TO THE SOCIÉTÉ ANONYME DES MATIÈRES COLORANTES ET PRODUITS CHIMIQUES DE ST. DENIS, OF SAME PLACE.

PRODUCTION OF AZO COLORS.

SPECIFICATION forming part of Letters Patent No. 380,927, dated April 10, 1888.

Application filed December 29, 1887. Serial No. 259,297. (No specimens.) Patented in France June 20, 1887, No. 184,549, and in England June 20, 1887, No. 9,315.

*To all whom it may concern:*

Be it known that we, ALCIDE FRANÇOIS POIRRIER and DANIEL AUGUSTE ROSENSTIEHL, both citizens of the French Republic, residing in Paris, France, have invented certain Improvements in the Production of Coloring-Matters (azo colors) Yellow, Orange, and Red, (which have been patented in France, June 20, 1887, No. 184,549, and England, June 20, 1887, No. 9,315,) of which the following is a specification.

This invention relates to the production of azoic coloring-matters, derivatives of nitroamines of the aromatic series, such as metanitraniline, nitro-toluidines fusible at 107° centigrade and at 78° centigrade, nitro-xylidine fusible at 123° centigrade, &c. Whichever of these nitro-amines is employed as the primary material, the process consists always of, first, reduction in an alkaline medium; second, subjection of the product of reduction to the action of nitrous acid, and, third, combination of the polyazoic derivative thus obtained with certain substances, such as the phenols, oxyphenols, naphthols, oxynaphthols, primary, secondary, and tertiary amines, diamines, and the alkyl, sulpho, and carboxyl derivatives of all these bodies. The process of preparing the product of reduction and the polyazoic derivative and the mode of preparing the coloring-matters with the said polyazoic derivative will be described in different cases.

FIRST. PREPARATION OF COLORING-MATTERS FROM METANITRANILINE.

(*a.*) *Preparation of the product of reduction of metanitraniline and its polyazoic derivative.*—A solution is made of 13.800 kilos of metanitraniline in 1.100 liters of boiling water. To it one hundred and forty-four kilos of caustic-soda lye of 36° Baumé are added. It is raised to ebullition and nineteen kilos of zinc-powder are added little by little with suitable precautions. A yellow precipitate separates, which constitutes the product of reduction nearly pure. Its purification is effected by simple crystallization in water mixed with hydrochloric acid. Of this product 10.600 kilos are dissolved in twenty-five kilos of hydrochloric acid of 20° Baumé and six hundred liters of water. The solution is cooled and a solution of 6.900 kilos of nitrite of soda in three times as much water is added thereto, a little at a time.

(*b*) *Preparation of the coloring-matters.*—The preparation of the coloring-matters by means of alpha-monosulpho alpha-naphthol derivative of the alpha-naphthylamine monosulpho of Piria and by means of metaphenylene diamine will be given as examples.

Alpha-sulpho alpha-naphthol: To the liquor containing the polyazoic derivative are added 22.500 kilos of alpha-monosulpho alpha-naphthol in the state of soda salt and ten kilos of carbonate of soda dissolved in two thousand liters of water. After standing, precipitation is effected by salt. The red coloring-matter thus obtained, like all those to which this specification relates, possesses, among other tinctorial properties, that of dyeing unmordanted cotton in an alkaline bath.

By replacing alpha-sulpho alpha-naphthol with equivalent quantities of the following bodies, coloring-matters are obtained having the same tinctorial properties as the preceding. The colors which they give in dyeing are as follows: alpha-naphthol, monosulpho alpha-naphthol derived from the alpha-naphthylamine monosulpho of Witt, bisulpho alpha-naphthols, alpha-naphthylamine, red; beta-naphthol, alpha-sulpho beta-naphthol, naphthionic acid, beta-naphthylamine sulpho-acid, orange; salicylic acid, anthranilic acid, phenol, resorcin, yellow.

Metaphenylene diamine: To the liquor containing the polyazoic derivative is added a solution of 10.800 kilos of metaphenylene diamine in one thousand liters of water, and also a quantity of carbonate of soda sufficient to render the solution after reaction slightly alkaline. Precipitation is effected by salt. The coloring-matter dyes cotton yellow.

SECOND. PREPARATION OF COLORING-MATTERS FROM NITRO-TOLUIDINE FUSIBLE AT 107° CENTIGRADE.

(a) *Preparation of the product of reduction of nitro-toluidine fusible at 107° centigrade and its polyazoic derivative.*—The operation is as described for metanitraniline—that is to say, to a boiling solution of 15.200 kilos of nitro-toluidine fusible at 107° centigrade in about twelve hundred liters of water and one hundred and forty-four kilos of caustic-soda lye of 36° Baumé, nineteen kilos of zinc-powder are added in small portions. A yellow precipitate forms, which is purified by crystallization in water mixed with hydrochloric acid. Of this product of reduction eight kilos are dissolved in twenty-five kilos of hydrochloric acid and the solution is diluted to six hundred liters with water. To this solution is added, with cooling, and a little at a time, 4.700 kilos of nitrite of soda dissolved in fifteen liters of water.

(b) *Preparation of the coloring-matters.*—Into the solution of the polyazoic derivative are introduced 16.300 kilos of alpha-sulpho alpha-naphthol (obtained from the decomposition of the alpha-naphthylamine sulpho of Piria) in the state of soda salt dissolved in two thousand liters of water and one hundred kilos of carbonate of soda are added. The reaction finished, the coloring-matter can be easily precipitated with salt. It colors cotton red.

By operation in the identical manner with the following bodies employed in quantities equivalent to the alpha-sulpho alpha-naphthol derivative of the alpha-naphthylamine monosulphonic acid of Piria, analogous coloring-matters are obtained. Thus the monosulpho alpha-naphthol derivative of the alpha-naphthylamine monosulpho of Witt gives a red coloring-matter, as also the alpha-naphthol bisulphonic acids; alpha and beta naphthols give brown coloring-matter; bisulpho beta-naphthol gives a red coloring-matter; alpha-sulpho beta-naphthol gives an orange coloring-matter; naphthionic acid gives an orange coloring-matter; phenol gives a yellow coloring-matter; resorcin gives a yellow coloring-matter. These coloring-matters, like those derived from metanitraniline, possess, among other tinctorial properties, that of dyeing unmordanted cotton in an alkaline bath.

THIRD. PREPARATION OF COLORING-MATTERS FROM NITRO-TOLUIDINE FUSIBLE AT 78° CENTIGRADE.

(a) *Preparation of the product of reduction of nitro-toluidine fusible at 78° centigrade and its polyazoic derivative.*—Into three hundred liters of water are introduced 15.200 kilos of nitro-toluidine fusible at 78° centigrade. It is boiled and fifteen kilos of zinc-powder of eighty-eight per cent. and one hundred kilos of caustic-soda lye of 1.36 density are introduced little by little. The zinc and the soda are added in two portions in the space of an hour. Heating is continued for from eight to ten hours, and the liquid is thereupon allowed to cool and is filtered. The precipitate constitutes the product of reduction. It is purified by crystallization in alcohol or in hydrochloric acid. Of this product twelve kilos are dissolved in twenty-five kilos of hydrochloric acid of 20° Baumé and six hundred liters of water, and to the solution there is then added a little at a time, and with cooling, a solution of 6.900 kilos of nitrite of soda in twenty liters of water.

(b) *Preparation of the coloring-matters.*—As example, the preparation will be given of the coloring-matter obtained with the alpha-sulpho alpha-naphthol derivative of the alpha naphthylamine monosulpho of Piria. To the liquor containing the polyazoic derivative from twelve kilos of the reduction product are added 22.500 kilos of the before-mentioned alpha-sulpho alpha-naphthol in the state of soda salt and ten kilos of carbonate of soda dissolved in two thousand liters of water. After standing for several hours precipitation is effected with salt. A red coloring-matter is thus obtained. By replacing the alpha-sulpho alpha-naphthol from the monosulpho alpha-naphthylamine of Piria by the equivalent quantities of the following bodies, coloring-matters analogous to the preceding are obtained, and give in dyeing the following colors or tints, respectively—that is to say: monosulpho alpha-naphthol derivative of the alpha-naphthylamine monosulpho of Witt, red; beta-sulpho beta-naphthol, orange-red; alpha-sulpho beta-naphthol, orange-red; bisulpho-naphthol, (salt R.,) red; isomeric bisulpho alpha-naphthols, red; resorcin, red; metaphenylene diamine, brown; naphthionic acid, orange; beta-naphthylamine sulpho-acid, yellow; naphthylamine, reddish-brown; naphthoic acid, brown.

FOURTH. PREPARATION OF COLORING-MATTERS DERIVED FROM NITRO-XYLIDINE FUSIBLE AT 123° CENTIGRADE.

(a) *Preparation of the product of reduction of nitro-xylidine and its polyazoic derivative.*—To a boiling solution of 16.600 kilos of nitro-xylidine in about thirteen hundred liters of water and one hundred and forty-four kilos of caustic-soda lye of 36° Baumé, nineteen kilos of zinc-powder are added a little at a time. A yellow precipitate forms, which is purified by crystallization in alcohol or in hydrochloric acid. Of the product of reduction 13.500 kilos are dissolved in twenty-five kilos of hydrochloric acid and six hundred liters of water. The whole is cooled, and 6.900 kilos of nitrite of soda dissolved in twenty liters of water are added to the solution little by little.

(b) *Preparation of the coloring-matters.*—As an example, the preparation is again given of the coloring-matter derived from the alpha-sulpho alpha-naphthol which the monosulphonated alpha-naphthylamine of Piria furnishes. The liquor containing the polyazoic derivative is run into a solution of 22.500 kilos of alpha-sulpho alpha-naphthol and ten kilos of carbonate of soda in two thousand liters of water. After some hours of repose the coloring-matter is formed. It is readily precipitated by salt. It dyes red.

Again, a list is given, by way of example, of the colors or tints given by the coloring-matters which are obtained by replacing the alpha-sulpho alpha-naphthol derived from the alpha-naphthylamine monosulpho of Piria with the equivalent quantity of one of the following bodies, namely: monosulpho alpha-naphthol obtained from the alpha-naphthylamine monosulpho of Witt, red; alpha-sulpho beta-naphthol, orange; beta-sulpho beta-naphthol, orange; bisulpho-naphthol, (salt R.,) bright red; isomeric bisulpho alpha-naphthols, red; resorcin, yellow; metaphenylene diamine, brown; naphthionic acid, orange-yellow; beta-naphthylamine sulpho-acid, orange; alpha-naphthylamine, brown; beta-naphthol, red; alpha-naphthol, violet; diphenylamine, yellow.

All the coloring-matters described in this specification are soluble in water with the exception of that from alpha-naphthol and from beta-naphthol; but by treating these with sulphuric acid according to known processes they are obtained in the state of soluble sulpho combinations of which the tinctorial properties are analogous to those of the coloring-matters hereinbefore described.

The new coloring-matters possess, among other properties, that of dyeing cotton in an alkaline bath, wool and silk in a neutral, an alkaline, or an acid bath, and of application in connection with the different mordants or salts generally employed in dyeing.

The nitro-amines which serve for the preparation of the polyazoic derivative employed for the manufacture of the coloring-matters, and which have been hereinbefore described, can be replaced by all the isomers of these nitro-amines.

The use of the isomers of the bodies hereinbefore indicated for the formation of coloring-matters by combination with the polyazoic derivative of the nitro-amines is likewise included in the invention. Moreover the body (phenol, oxyphenol, naphthol, oxynaphthol, primary, secondary, or tertiary amine) with which the polyazoic derivative of the nitro-amines is combined can be monosulpho-conjugated or bisulpho-conjugated.

In the examples given for the preparation of coloring-matters the alpha-naphthol monosulpho derived from the alpha-naphthylamine monosulpho of Piria can be replaced, for example, by the alpha-naphthol monosulpho derived from the alpha-naphthylamine monosulpho of Witt.

The isomeric alpha-naphthol bisulpho compounds can likewise be substituted for alpha-sulpho alpha-naphthol. These alpha-naphthol bisulpho compounds are obtained by boiling the diazoic derivatives of the bisulpho-acids of naphthylamine resulting from the action of fuming sulphuric acid upon the naphthionic acid of Piria.

We claim as our invention or discovery—

1. The described process of reducing in an alkaline medium nitro-aromatic amines, particularly metanitraniline, the isomeric nitro-toluidines fusible at 107° centigrade and 78° centigrade, and nitro-xylidine fusible at 123° centigrade, substantially as described.

2. The process of preparing azoic coloring-matters by the application of the products obtained by the reduction in an alkaline medium of nitro-aromatic amines, particularly nitraniline, the isomeric nitro-toluidines fusible at 107° centigrade and 78° centigrade, and nitro-xylidine fusible at 123° centigrade, the said process consisting in combining the polyazoic derivatives of these reduction products with the phenols, the oxyphenols, the naphthols, the oxynaphthols, the primary, secondary, and tertiary amines, the diamines, and also the alkyl, sulpho, and carboxyl derivatives of all these bodies, substantially as described.

3. The coloring-matters products of the described reaction having the characteristics set forth.

In witness whereof I have hereunto signed my name in the presence of two subscribing witnesses.

ALCIDE FRANÇOIS POIRRIER.

Witnesses:
JULES ARMENGAUD, Jeune.
J. B. BOURNE.

In witness whereof I have hereunto signed my name in the presence of two subscribing witnesses.

DANIEL AUGUSTE ROSENSTIEHL.

Witnesses:
H. GRAND,
R. DUPLANC.